United States Patent

Gessel et al.

[11] Patent Number: 5,889,954
[45] Date of Patent: Mar. 30, 1999

[54] NETWORK MANAGER PROVIDING ADVANCED INTERCONNECTION CAPABILITY

[75] Inventors: Robert J. Gessel, Plano; Thomas Kevin Autrey, Dallas, both of Tex.

[73] Assignee: Ericsson Inc., Richardson, Tex.

[21] Appl. No.: 771,014

[22] Filed: Dec. 20, 1996

[51] Int. Cl.$^6$ ..................................................... G06F 17/00
[52] U.S. Cl. ..................................... 395/200.53; 395/500
[58] Field of Search .................. 395/200.54, 200.53, 395/200.5, 200.51, 200.52, 500, 200.55; 364/578, 182.02; 370/255, 402

[56] References Cited

U.S. PATENT DOCUMENTS

| | | | |
|---|---|---|---|
| 5,027,343 | 6/1991 | Chan et al. | 370/17 |
| 5,060,140 | 10/1991 | Brown et al. | 364/200 |
| 5,142,622 | 8/1992 | Owens | 395/200 |
| 5,278,823 | 1/1994 | Handel | 370/13 |
| 5,530,703 | 6/1996 | Liu et al. | 370/405 |
| 5,812,826 | 9/1998 | Mclain et al. | 395/500 |

OTHER PUBLICATIONS

Sun Microsystems, Inc., Printout of an on–line tutorial of the SUN Operating System; Chapter 10: "A Socket–based Interprocess Communications Tutorial;" pp. 10–1 through 10–34; Chapter 11: An Advanced Socket–based Interprocess Communications Tutorial; pp. 11–1 through 11–46.
Keith Scott and Nicholas Bambos; "The Self–Organizing Wireless Network (SWAN) Protocol for Communication Among Mobile Users"; *IEEE*; Nov. 14, 1995; pp. 355–359.
Averill M. Law and Michael G. McComas; "Simulation Software for Communications Networks: The State of the Art"; *IEEE Communications Magazine*; Mar.,1994; No. 3.; pp. 44–50.
E. Vázquez, J. Vinyes, D. Fernández; "Graphical Interface for Communication Network Analysis and Simulation" *IEEE 6th Mediterranean Electrotehnical Conference;* May 22–24, 1991, Proceedings vol. II; pp. 1109–1112.
Alexander Dupuy, Soumitra Sengupta, Ouri Wolfson, and Yechiam, Yemini; "NETMATE: A Network Management Environment"; *IEEE Network Magazine;* Mar. 5, 1991; No. 2, pp. 35–43.
Robb Mills; "Communication Network Analysis with Comnet II.5"; *Proceedings of the 1989 Winter Simulation Conference;* Mar. 2, 1990; pp. 215–221.

*Primary Examiner*—Ellis B. Ramirez
*Attorney, Agent, or Firm*—Steven W. Smith

[57] ABSTRACT

A network manager for configuring and controlling a simulated telecommunications network having a plurality of nodes which communicate in a plurality of communications protocols. The network manager dynamically connects and disconnects each of the plurality of nodes to the network. The network manager also determines which of the plurality of communications protocols is utilized by each of the plurality of nodes, establishes connections between nodes which communicate in compatible communications protocols, and denies connections requested between nodes which communicate in incompatible communications protocols. The network manager includes a Design function and a Supervisory function. The Design function sets up the network, defines nodes, defines which nodes are to operate on which workstations, and establishes connections. The Supervisory function manages and operates the network. This includes launching the network, monitoring the nodes and links, and reconfiguring the network when requested. The Supervisory function initiates each node, dynamically takes nodes down and brings them back up again, severs links and reinstates them, and provides an operator with status information for each node and each link in the network. A Graphical User Interface is provided for operator interaction with the network manager.

38 Claims, 12 Drawing Sheets

NETWORK MANAGER PROVIDING ADVANCED INTERCONNECTION CAPABILITY

BACKGROUND OF THE INVENTION

1. Technical Field of the Invention

This invention relates to telecommunication systems and, more particularly, to a network manager providing advanced interconnection capability by dynamically allocating nodes in a simulated telecommunications network.

2. Description of Related Art

In the telecommunications industry, standard telecommunications networks are linked to each other using protocols based on the Open Systems Interconnection (OSI) model. The OSI model is an internationally accepted framework of standards for communication between different systems manufactured by different vendors. The OSI model creates an open systems networking environment where any vendor's computer system, connected to any network, freely shares data with any other computer system on that network or a linked network.

The OSI model organizes the communication process into seven different layers of interrelated protocols in a layered sequence based on their relation to the user. Layers 1 through 3 deal with network access and layers 4 through 7 deal with end-to-end communications between the message source and the message destination. Each layer includes at least one function that is contained between an upper and a lower logical boundary. The services of each layer are combined with the services of lower layers to create new services that are made available to the higher layers. The layers are as follows:

Layer 1 is a physical layer tlat provides transmission of signals and the activation and deactivation of physical connections;

Layer 2 is a data link layer that includes signal synchronization, error correction, sequencing, and flow control. This layer also provides a data transmission link across one or several physical connections;

Layer 3 is a network layer that provides routing and switching functions;

Layer 4 is a transport layer utilizing layers 1 to 3 to provide an end-to-end service having required characteristics for the higher layer functions;

Layer 5 is a session layer that provides the means to establish a session connection and to support an orderly exchange of data and related control functions for a particular communication service;

Layer 6 is a presentation layer that provides means for data formatting and code conversion; and Layer 7 is an application layer, the protocols of which provide the actual service sought by an end user.

During development and testing of telecommunication systems and new service applications, it is common to develop a set of interrelated software programs which, when combined, model or simulate the system hardware. The effects of adding new service applications, or the effects of proposed hardware or software changes in the system, can be rapidly modeled and analyzed without undergoing the costly and time consuming process of actually modifying the system hardware or loading a new service application in an actual system. Problems arise, however, and the cost of testing increases substantially when the functions to be tested require communications between two or more telecommunication systems.

Existing communication links utilized for linking standard telecommunications systems generally comprise computing software that executes and assembles OSI layers 3–7 and transmission hardware that executes OSI layers 1–2. When a link between two telecommunication systems, or between a telecommunication system and a system simulator is required for testing purposes, the systems are normally connected directly to each other with the same transmission hardware that is utilized for physically connecting installed telecommunication systems in the field. Test equipment and test tools are then connected to the systems and the physical links between them for the purpose of monitoring the links and performing protocol analyses or other evaluation tests.

As utilized herein, the term "emulator" refers to a software program that emulates the hardware of a processing node and interprets the application software as if the application software was running on a target machine. System emulators are utilized to emulate a target telecommunication node. Emulators perform operations with blocks of application software utilized in the target telecommunication node. The operations validate the use of the network communications protocol with the target telecommunication node software. The term "simulator" refers to a processor that is preprogrammed with responses to anticipated messages. A protocol simulator and a telecommunication system emulator may be connected to the network to validate the use of several network communications protocols with the target telecommunication node software.

It is often desirable to configure the network to test a plurality of communications protocols with a plurality of telecommunication nodes and emulators. However, there does not currently exist a network management tool capable of managing, in real time, the interconnection of telecommunication node emulators, protocol simulators, and other test tools that transmit signaling information over the network.

Although there are no known prior art teachings of a solution to the aforementioned deficiency and shortcoming, U.S. Pat. No. 5,027,343 to Chan et al. (Chan) discusses subject matter that bears some relation to matters discussed herein. Chan discloses a test access system for remote testing of products in an integrated services digital network (ISDN) system. The protocols tested relate to OSI layers 1–3 which are concerned mainly with the establishment, holding, and release of a physical telecommunications path. Chan packetizes or encapsulates network messages, including layers 1–3, and utilizes a packet switching network to conmnunicate test procedures from the tester to the system under test. The system under test de-encapsulates the packets, removes the network messages, and sends them to be processed.

Chan is specifically designed to support remote testing of actual physical hardware. A local site which includes a tester is remotely linked to a system under test. Chan specifically states, however, that the patent is directed only to OSI layers 1–3, which are concerned with the physical transmission, routing, and switching of signals. Chan does not teach or suggest a network manager that dynamically allocates telecommunication nodes, emulators, protocol simulators, and other test tools within a network in real time.

Review of each of the foregoing references reveals no disclosure or suggestion of a system or method such as that described and claimed herein.

In order to overcome the disadvantage of existing solutions, it would be advantageous to have a network manager that provides better management of simulated networks. The manager would dynamically allocate telecommunication nodes, emulators, protocol simulators, and other test tools within a network upon request. Such a manager would effectively change the network configuration "on the fly" and provide the network with advanced interconnection capabilities. The present invention provides such a network manager.

SUMMARY OF THE INVENTION

In one aspect, the present invention is a network manager for configuring and controlling a simulated telecommunications network having a plurality of nodes which communicate in a plurality of communications protocols. The network manager comprises means for connecting each of the plurality of nodes to the network manager, and means for disconnecting each of the plurality of nodes from the network manager. The network manager also includes means for determining which of the plurality of communications protocols is utilized by each of the plurality of nodes, means for establishing connections between nodes which communicate in compatible communications protocols, and means for denying connections requested between nodes which communicate in incompatible communications protocols.

In another aspect, the present invention is a network manager for configuring and controlling a simulated telecommunications network having a plurality of nodes which communicate in a plurality of communications protocols. The network manager comprises a Designer function that sets up the network, and a Supervisory function that dynamically controls the network. The Designer function includes means for defining the plurality of nodes, and means for establishing an initial network configuration by allocating each of the plurality of nodes to a workstation. The Supervisory function includes means for monitoring the status of each of the plurality of nodes, means for monitoring the status of links between the nodes, and means for dynamically reconfiguring the network.

In yet another aspect, the present invention is a method of configuring and controlling a simulated telecommunications network having a plurality of nodes which communicate in a plurality of communications protocols. The method includes the steps of connecting each of the plurality of nodes to the network manager, determining which of the plurality of communications protocols is utilized by each of the plurality of nodes, establishing connections between nodes which communicate in compatible communications protocols, and denying connections requested between nodes which communicate in incompatible communications protocols.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The present invention is a network management tool that dynamically allocates nodes in a telecommunications network, adding or removing nodes when requested. The network manager effectively changes the network configuration on the fly, and provides advanced interconnection capability using the UNIX socket concept.

Figure 1:
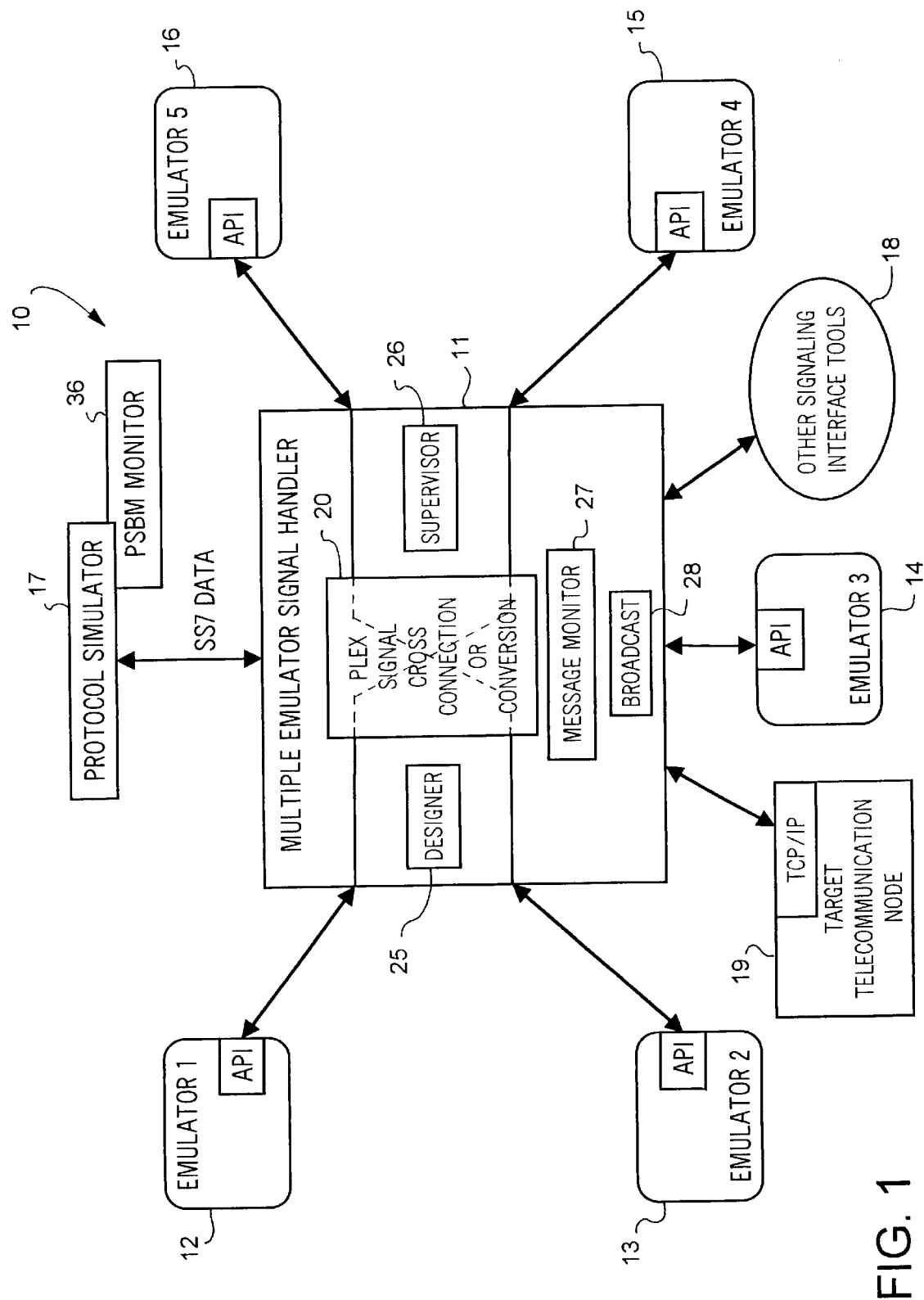
FIG. 1 is a simplified functional block diagram of the network manager of the present invention.

FIG. 1 is a simplified functional block diagram of the network manager 10 of the present invention. In the preferred embodiment described herein, the network manager provides the network with advanced interconnection capabilities utilizing a UNIX socket concept. The telecommunication protocol is encapsulated by the Transmission Control Protocol/Internet Protocol (TCP/IP) and then transmitted via a LAN network utilizing an Internet socket interface. The Internet socket interface is a type of UNIX file that provides network communications between applications operating on different host processors. The socket interface allows application programs to communicate with each other. In general, an application program creates a TCP client socket, connects to a TCP server socket, and then sends or receives data across that interface.

The Internet socket interface may be thought of as a generalization of the UNIX file access mechanism that provides an endpoint for communication. Application programs request the operating system to create a socket when one is needed. Sockets are created without binding them to specific destination addresses. The application may then supply a destination address each time it uses the socket (e.g., when sending datagrams), or it may choose to bind the destination address to the socket and avoid specifying the destination repeatedly (e.g., when making a TCP connection). A client socket connects to a server socket to allow communication between application programs.

A standard Internet protocol is the User Datagram Protocol (UDP). The UDP protocol includes a protocol port number allowing a sender to distinguish among multiple destinations (application programs) on a remote processor. UDP/IP sockets are utilized for establishing, maintaining, and removing communications between application programs while TCP/IP sockets are utilized to transfer data reliably.

Referring again to FIG. 1, the core of the network manager 10 is a Multiple Emulator Signal Handler (MESH)

11. The MESH 11 is a software program which is resident on the network, similar to an application program. The MESH allows the interconnection of the TCP/IP connection points (sockets). The MESH defines a protocol type for each device, and establishes a set of allowable connections between devices. The MESH denies connections between devices of different protocol types, even though they may all be TCP/IP connections. Rules are defined within the MESH for allowable connections.

Emulator-1 through Emulator-5 (12–16) are shown connected to the MESH 11. As discussed above, the term "emulator" refers to a software program that emulates the hardware of a processing node and interprets the application software as if the application software was running on a target machine. System emulators are utilized to emulate a target telecommunication node. Emulators perform operations with blocks of application software utilized in the target telecommunication node. The operations validate the use of the network communications protocol with the target telecommunication node software.

In FIG. 1, there are different categories of interconnection. For example, from Emulator-1 (12) to Emulator-2 (13), the system transfers emulator CPU instructions and the internal emulator CPU instructions between the two devices. In a second type of connection, the system may receive CPU instructions from an emulator and convert them to SS7 data going to a protocol simulator 17. In a third type of connection, CPU instructions are transferred to some other format that may be sent out in TCP/IP format to other signaling interface tools 18. Additionally, a target telecommunication node 19 may be connected to the network manager 10, and may communicate over the network with other target telecommunication nodes, emulators, or protocol simulators by sending SS7 data in TCP/IP format. By interconnecting multiple emulators, protocol simulators, target telecommunication nodes, and other signaling interface tools, the present invention may be utilized to define and manage a complete telecommunications network.

In one example, Emulator-1 (12) may emulate a Mobile Switching Center (MSC), and Emulator-2 (13) may emulate the Public Switched Telephone Network (PSTN). Emulator-3 (14) may emulate a Home Location Register (HLR) and Emulator-4 (15) may emulate an Advanced Mobile Phone System (AMPS) MSC. Additional emulators may be added without limitation. The invention can also interconnect with any actual hardware systems 19 that communicate with the TCP/IP protocol.

Figure 2:
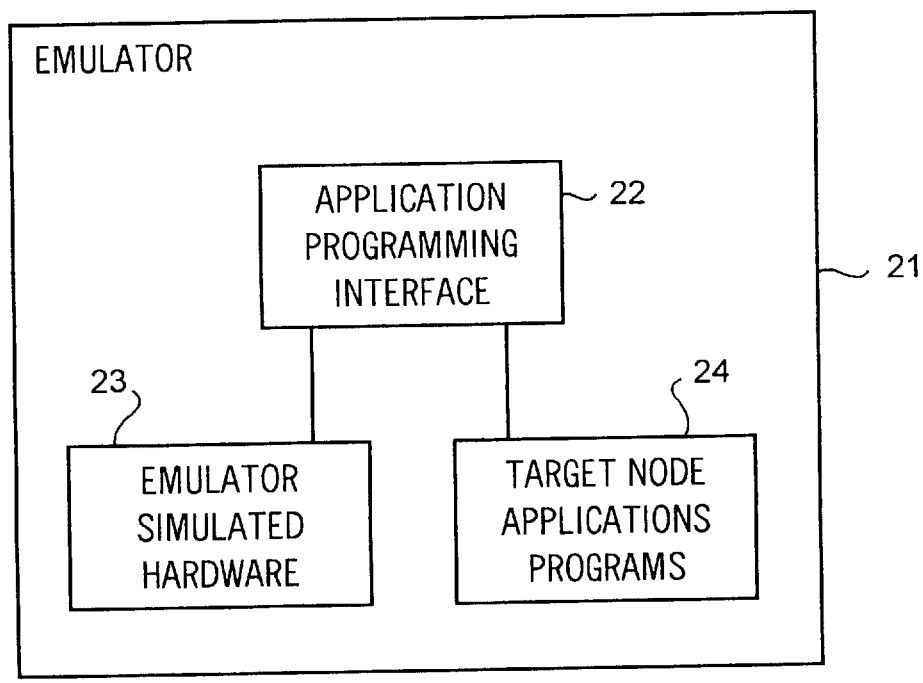
FIG. 2 is a simplified functional block diagram illustrating software blocks in a typical telecommunication system emulator which may be connected to the network manager of the present invention.

The concept of a "network of emulators" must be clearly understood to understand the functions of the network manager. FIG. 2 is a simplified functional block diagram illustrating software blocks in a typical telecommunication system emulator 21 which may be connected to the network manager 10 of the present invention. Each emulator 21 supports signals within a Central Processor and out to a plurality of Regional Processors and the socket interface to the network. At that point, the signals must either be caught and returned, or handled by another tool connected to the socket interface.

The signals for SS7 signalling links are a known set of signals that are transferred between emulators as if they were "transported" via a real signaling link. However, when transferring emulator CPU instructions at this level, the OSI hardware layers 1 and 2 are effectively replaced by UNIX transfer mechanisms. For Signaling Terminal Central-Signaling Terminal Remote (STC-STR) and other similar signaling types which signal between a central processor and a regional processor, a defined set of emulator CPU instructions are identified and converted into standardized data streams for transmission to other tools, emulators, or programs.

Each emulator 21 includes an Application Programming Interface (API) 22 which provides a general interface for external tools to communicate with the emulator. The API 22 includes a library of functions that any external tool may utilize to interface with the emulator. This interface is the one used by the network manager 10 to send and receive signaling information to and from different emulators on the network. Therefore, the network manager program must know which of the emulators in the defined network can communicate with each other. The network manager receives the emulator CPU instructions, evaluates where they came from and using information in the Signal Cross Connect table 20 (FIG. 1), determines the destination.

Other software blocks within the emulator 21 include emulator simulated hardware 23 which simulates the hardware of the telecommunications node being emulated. In addition, the emulator includes actual target node applications programs 24 which are utilized to exercise and test the performance of the applications and related communications protocols.

Referring again to FIG. 1, for signaling of CPU instructions between emulators 12–16, certain signal sets must be known to the network manager in order to properly interconnect the emulators. For example in Japan, some signal sets between CPU instruction blocks are unique because some interfaces for actual signalling traffic are specific to the Japanese SS7 protocol. These signal sets are tied to defined signaling points that are operating under the Japanese standard. The network manager does not allow signaling points of different standards to be interconnected by definition.

The network manager 10 of the present invention enables an operator to actually define and control the network in the UNIX environment. The manager allows the operator to define the location and platform for each connected device to run in the UNIX environment. The MESH 11 may designate a different workstation to run each emulation, and thereby distribute the simulated telecommunications network over a local area network (LAN) or wide area network (WAN). This helps prevent overloading of the network or a particular part of the UNIX environment. The MESH 11 monitors the UNIX network and keeps track of where each device is connected. The MESH also defines the type of connection for each device, and therefore knows which devices have compatible connections and may be interconnected. Thus, the MESH may determine where the protocol simulator 17 is connected and where other devices are connected so that they can be interconnected.

The network manager 10 provides the ability to run one or several emulators on user defined workstations. Telecommunication system emulators consume large amounts of workstation memory, therefore a single workstation often does not have enough memory to run several emulator processes. The network manager 10 controls initialization and execution of the emulators on other workstations and interconnects them by remote shell to a specified workstation. Again, UNIX sockets and TCP/IP connections are used to move data between the emulators and the network manager. The destination of the operator display for each emulator may also be controlled so that multiple windows can be distributed across more than one workstation.

A typical UNIX-based emulator 21 may be operated on a Sparc 5 Workstation from SUN Microsystems having 32 Mb RAM and 200 Mb swap space on the workstation's hard drive. The protocol simulator 17 may be operated on a SUN Sparc 20 Server having 32 Mb RAM and 1,000 Mb swap space on the server's hard drive. These hardware configurations are described for illustrative purposes only, and are not intended to limit the scope of the present invention which may be implemented with other hardware configurations.

The MESH 11 monitors each TCP/IP connection (link) and interprets data as it is received, processed, and transmitted to its destination. The data is then manipulated and presented to the operator in a logical form. A Graphical User Interface (GUI) enables the operator to configure or reconfigure the network on a display screen by dragging and dropping icons representing nodes, and dragging and dropping lines between the icons which then become TCP/IP socket connections between the nodes. For each node, the operator can then set its properties by double clicking on the icon and entering the desired properties in a pop-up window. Links also have definitions that can be edited by the operator such as Signalling Link Code utilized, number of links per set, Destination Point Code (DPC), Own Point Code (OPC), etc.

Figure 3:
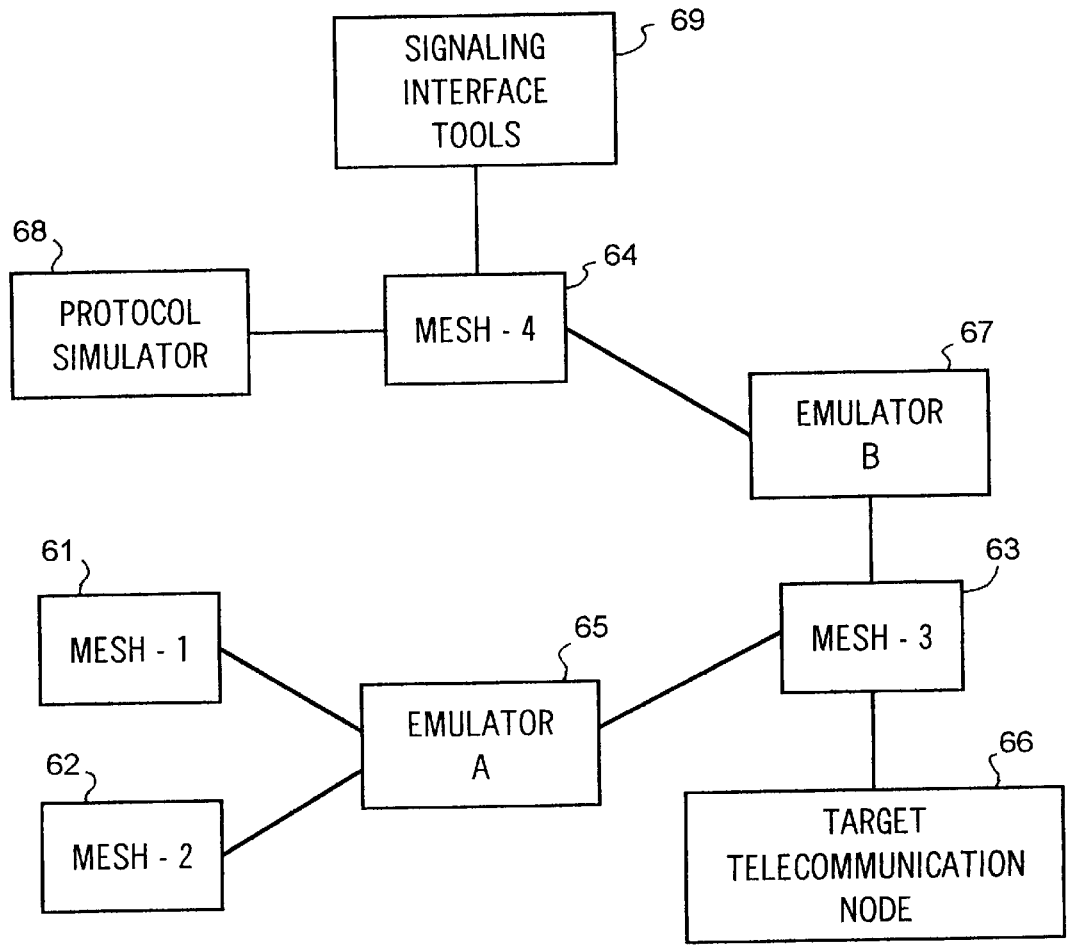
FIG. 3 is a simplified block diagram of an exemplary configuration of a plurality of interconnected Multiple Emulator Signal Handlers (MESHs)

The network may also operate across the Internet. Thus Emulator-1 (12) could be running on a workstation in Sweden, Emulator-2 (13) could be in Germany, and Emulator-3 (14) could be in the United States. Multiple MESHs 11 may also be interconnected by connecting multiple NESHs to a single node such as an emulator. An exemplary configuration of multiple MESHs is illustrated in FIG. 3. One MESH may be run in the U.S. for a PCS network simulation, another MESH may be run in Germany for a GSM network simulation, and another MESH may be run in Sweden for an international gateway network simulation. These MESHs may then be interconnected to simulate a worldwide telecommunications network, and to test the signaling interfaces between the simulated networks.

FIG. 3 is a simplified block diagram of an exemplary configuration of a plurality of interconnected MESHs 61–64. MESH-1, MESH-2, and MESH-3 are connected to Emulator-A 65 which communicates with all three MESHs. MESH-3, in turn, has connected to it, a target telecommunication node 66 and Emulator-B 67. MESH-4 is also connected to Emulator-B. MESH-4, in turn, has connected to it, a protocol simulator 68 and other signaling interface tools 69. In this manner, simulated networks managed by each MESH 61–64 may be interconnected to simulate a worldwide telecommunications network, and to test the signaling interfaces between the simulated networks.

Referring again to FIG. 1, the MESH 11 includes a Designer function (Designer) 25 and a Supervisory function (Supervisor) 26. Through the GUI, the Designer 25 serves to configure the network, define nodes, define which nodes are to operate on which workstations, establish connections, etc. The Designer may save, reload, copy, restore, and perform other practical management commands when working with a network configuration file. Configuration files may be transferred between users and transported between different test sites, provided each site has the appropriate tool set to support the defined network.

The Supervisor 26 serves to manage and operate the network. This includes launching the network, monitoring the status of nodes and links, and reconfiguring the network when requested. The Supervisor initiates each node and gets it up and running, dynamically takes nodes down and brings them back up again, severs links and reinstates them, etc. The Supervisor also gives status information for each node and each link in the network.

Thus, the Supervisor 26 is the main tool that allows an operator to control and supervise the multiple emulators and associated traffic handling tools. The Supervisor allows the user to launch the network and monitor the nodes in the network. It uses the GUI to show the operator a network representation on a display screen, and processes commands and other user inputs that are destined for one or more emulator nodes. Individual tools may also be represented in the network, but they are not accessible by the Supervisor. The Supervisor has the ability to identify other non-emulator tools that are connected into the network and to perform conversion and routing of data to/from these tools and target telecommunication nodes or emulators.

The network manager 10 also includes a message Monitor function 27 which enables the operator to view raw signaling data as it passes between the network manager 10 and connected emulators 12–16, protocol simulator 17, or other tools 18. The messages being transferred between any two signaling points that are connected by the network manager are displayed to the operator. Utilizing the GUI, a system operator may drop a "severing" icon on a link to trigger the signaling that simulates severing a link. The operator may then drop a "monitor" icon on a link to monitor what data is passing through that link at that time. Even though the link is a TCP/IP link, the Monitor function 27 converts the TCP/IP data to a telecommunications protocol such as SS7, and provides the user with an indication of the telecommunication signaling information that is passing through the link. The network manager strips out the SS7 data and sends it to the protocol simulator 17 or a protocol analyzer (not shown) for decoding and analysis. Appropriate traffic signaling is displayed in a pop-up or permanent window once selected by the operator. The messages sent between each node may be traced in a sequence diagram or ladder diagram in real time as the network is executing signaling. The monitor function 27 may also be utilized without severing or otherwise affecting the operation of the signaling link.

A Protocol Simulator Based Monitor (PSBM) function 36 decodes the traffic data in a more user-friendly format than the message Monitor function 27 which displays only raw hex data. All traffic between two endpoints is routed to the PSBM function 36 for decoding prior to display to the operator.

The Supervisor 26 handles changes in the network configuration at "run time". That is, even if a network is already started, an operator can still change the network configuration without restarting all the nodes. Additionally, the operator may dynamically remove an emulator node in real time, thus simulating the complete failure of a node in the network. The network manager 10 may then be utilized to reconfigure the network to bypass the malfunctioning node or link. Nodes and links may be dynamically added to bypass the malfunctioning node or link. Rerouting of the traffic can then be monitored as described above.

The network manager 10 may also be utilized to define a signaling loop in the network. In a signaling loop, a node is connected to itself by connecting two signaling terminals together. The procedure is similar to connecting two emulators, but the loop causes an emulator to connect to itself.

The network manager 10 can also broadcast a socket-based SS7 message from one originating node in the network to multiple receiving nodes in the network. A broadcast function 28 controls the connection of the originating node to the multiple receiving nodes, and enables identical messages to be sent from the originating node to the receiving nodes. The network manager can also make this connection in reverse, enabling multiple nodes to originate messages to a single receiving node. This may occur independently, or in response to a broadcast message from the single node. The single receiving node processes received messages in the order in which they are received.

These types of testing capabilities are not practical or possible utilizing physical test plants because of the expense and logistics involved. The network manager 10 of the present invention takes network testing far beyond what can be accomplished in a physical test plant. For example, by utilizing the power of a UNIX network, which may easily have 300 or more workstations, the present invention dynamically manages a simulated network of 300 or more telecommunications nodes utilizing multiple communications protocols, thereby removing the limitations of physical space and test plant capacity. There is no practical limit to the number of workstations or the total number of nodes in the network, although constraints may be imposed by the workstation operating system limits.

The Supervisor 26 is the primary interface of the network manager 10. The Supervisor supports interfaces for certain tools that can be connected to nodes (emulator dumps) in the network. These tools must be specified in a network definition file in order for them to be connected and controlled by the network manager. In the network configuration illustrated in FIG. 1, the socket-based emulators 12–16, the protocol simulator 17, and other signaling tools 18, if any, are defined in the network definition file.

The Supervisor 26 displays a network map window which mirrors the network map created by the operator. The operator merely selects one of the network nodes which is an emulator 12–16, and sends commands directly to this node. This action updates the currently selected emulator in another sub-window. This allows the operator to control each emulator through the network manager, thus enabling the operator to click on a node, give a MML command, and have the command and emulator status displayed in a printout in another sub-window or pop-up window.

Figure 4:
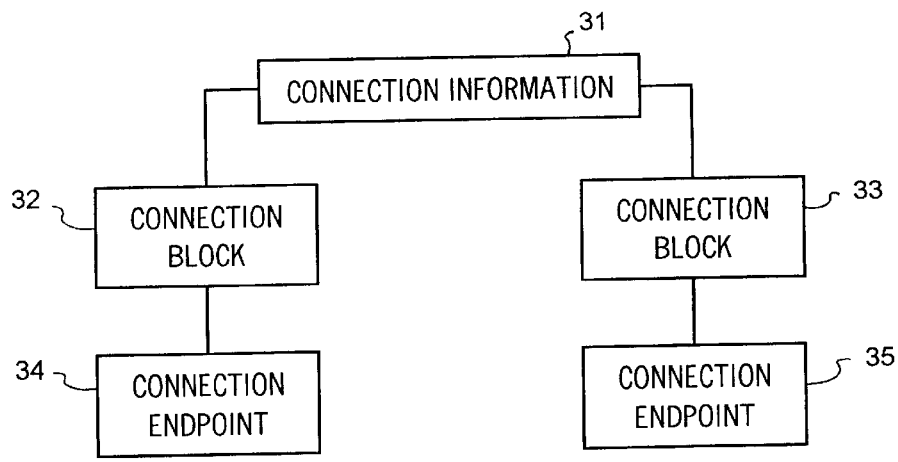
FIG. 4 is an illustrative drawing of a typical connection of two connection endpoints maintained by the network manager.

FIG. 4 is an illustrative drawing of a typical connection of two nodes maintained by the network manager 10. A Connection Information (CI) 31 is shown to connect a first Connection Block (CB) 32 to a second CB 33. Each CB has an associated Connection Endpoint 34 and 35 which may be for example, a target telecommunications node, an emulator signal terminal, an emulator Signal Terminal Central (STC), or a protocol simulator. Within the network manager, all traffic passes from one CB, through connections programmed as CIs, to another CB. The CI 31 is a block of software and data which includes the information necessary to complete a connection to a particular connection endpoint. One CI exists for each connection to the network manager 10. Each CB is an abstraction of a connection's endpoint 34 and 35. Each CB is assigned to a particular element of the network which is capable of sending or receiving data.

The CB points back to the CI, which points to another CB, which represents the other end of the connection. Since the source of each message coming into the network manager is known, the source information is utilized to obtain a pointer to a CB. That CB, in turn, provides a pointer to the CI, which points to the CB for the other side of the connection. For example, a message from Connection Endpoint 34 points to CB 32. CB 32, in turn, provides a pointer to the CI 31, which points to CB 33 and its associated Connection Endpoint 35. In this manner, the network manager 10 (FIG. 1) determines the destination for each incoming message.

As noted above in FIG. 1, a protocol simulator 17 may be connected to the network manager 10 for communication with the other nodes on the network. The protocol simulator 17 comprises a UNIX process running standard simulation tools. The standard tools include test script software that performs call origination functions. These scripts are then built into OSI layers 3–7 and sent to a UNIX adaptor. The UNIX adaptor packages the layers in TCP/IP format for transmission through Internet sockets and a LAN connection to the network manager 10. The network manager checks for protocol compatibility and forwards the transmission to a target system emulator, for example emulator 21 in FIG. 2.

The protocol simulator 17 enables an operator to select either an actual target hardware node or a node emulated by software for the testing of OSI layers 3–7. If a hardware node is selected, a communications manager within the protocol simulator identifies this selection to a protocol simulation socket adaptation module (protocol simulation adaptor) which then selects the proper protocol simulation software (protocol shelf) and protocol stack for the hardware node. Messages in UNIX-based TCP/IP protocol are sent through one of a plurality of Internet sockets to the LAN. The messages exit the LAN through an Internet socket and are directed to a UNIX adaptor which translates the TCP/IP protocol to SS7 messages which are understood by the target telecommunication hardware node.

If an emulator 21 is selected for the testing, the communications manager in the protocol simulator 17 identifies this selection to the protocol simulation adaptor which then selects the proper protocol simulation software (protocol shelf) and protocol stack for the emulated system. Messages in UNIX-based TCP/IP protocol are sent through one of the plurality of Internet sockets to the LAN. The messages exit the LAN through a gateway Internet socket and are directed to the emulator 21.

For communication with an emulator 21, the protocol simulation adaptor utilizes the SS7 TCP/IP protocol. Test messages may also include header octets that are proprietary between the protocol simulator 17 and target or emulated telecommunication node to identify the source of the message, message length, protocol revision, etc. The test messages are communicated through one of the Internet sockets over the LAN such as, for example Ethernet, through the gateway Internet socket to the emulator 21. In the Application Programming Interface 22, the TCP/IP protocol and headers are then stripped off, and the test messages are converted to emulator CPU instructions. The CPU instructions are then sent to the emulator CPU for processing and exercising the software to be tested or executed.

The emulator 21, as shown in FIG. 2, includes the application software programs 24 from the simulated telecommunication node as well as software modules 23 that emulate the hardware of the target node. The emulator exercises the software to be tested, verifies the use of the simulated communications protocol with the target telecommunication node, and responds back toward the protocol simulator 17. Therefore, after a user develops test sequences for an application on the emulator 21, the protocol simulator 17 may be utilized to test the application on the target hardware using the same test sequences.

Figure 5:
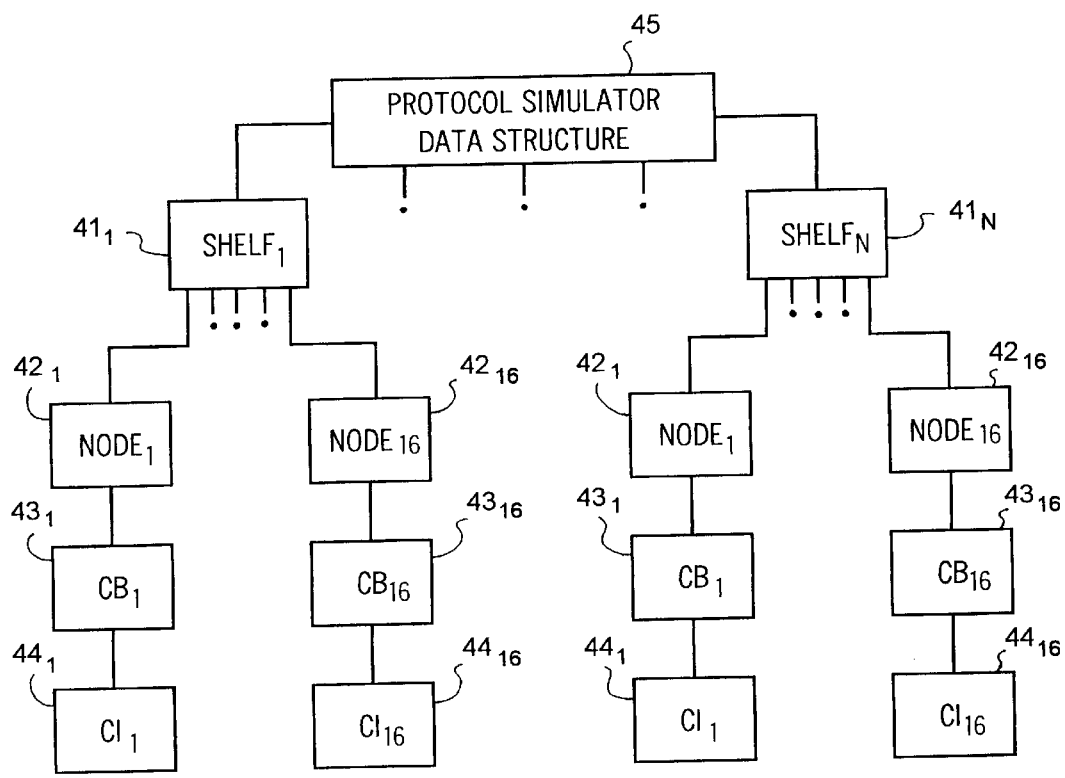
FIG. 5 is an illustrative drawing of a protocol simulator data structure and its relationship to associated Connection Blocks (CBs) and Connection Informations (CIs) according to the teachings of the present invention.

FIG. 5 is an illustrative drawing of a protocol simulator data structure 45 and its relationship to associated Connection Blocks (CBs) and Connection Informations (CIs)

according to the teachings of the present invention. In the preferred embodiment, the data structure illustrated in FIG. 5 exists for each protocol simulator 17 connected to the network manager. Each protocol simulator data structure 45 includes one or more protocol simulation software modules (protocol shelves) $41_1$ through $41_N$. Each shelf 41 has from one to sixteen associated node structures $42_1$ through $42_{16}$. Each node structure 42 represents a node on its associated protocol simulation software module (shelf) 41. Each node structure 42 has one associated Connection Block (CB) $43_1$ through $43_{16}$. As described above in FIG. 4, each CB 43 points to a Connection Information (CI) $44_1$ through $44_{16}$ which provides all the information required to transmit data from the protocol simulator side of the connection to the endpoint on the other side.

Shelf structures 41 and node structures 42 are allocated at the time the operator-specified protocol simulator is contacted by the network manager 10. Each defined shelf and associated node is "registered" with the network manager via a Shelf Registration Message and a Node Registration Message, respectively. The shelf and node structures are then allocated and populated with information which uniquely identifies the shelf and node combination to the protocol simulator software. When each node is allocated, its associated CB is also allocated and attached to the node. The network manager 10 responds to the Node Registration Message with a pointer to a function in the network manager and a pointer to the CB 43 associated with that node 42.

When the protocol simulator transmits a data message from a node 42, the simulator calls the function to which the network manager pointed in response to the Node Registration Message. The protocol simulator includes the CB pointer and a pointer to the data being transmitted. The network manager 10 utilizes the CB 43 to determine the destination of the data message and formats and routes the data accordingly.

When a data message is being transmitted to a node 42 in the protocol simulator, the CB 43 is utilized by the network manager 10 to determine the destination node. The destination node, in turn, is utilized to determine the destination shelf and protocol simulator data structure 45. The network manager then utilizes information contained in the protocol simulator data structure 45, shelf structures 41, and node structures 42 to call a routine which passes the data message to the proper node on the proper shelf.

Figure 6:
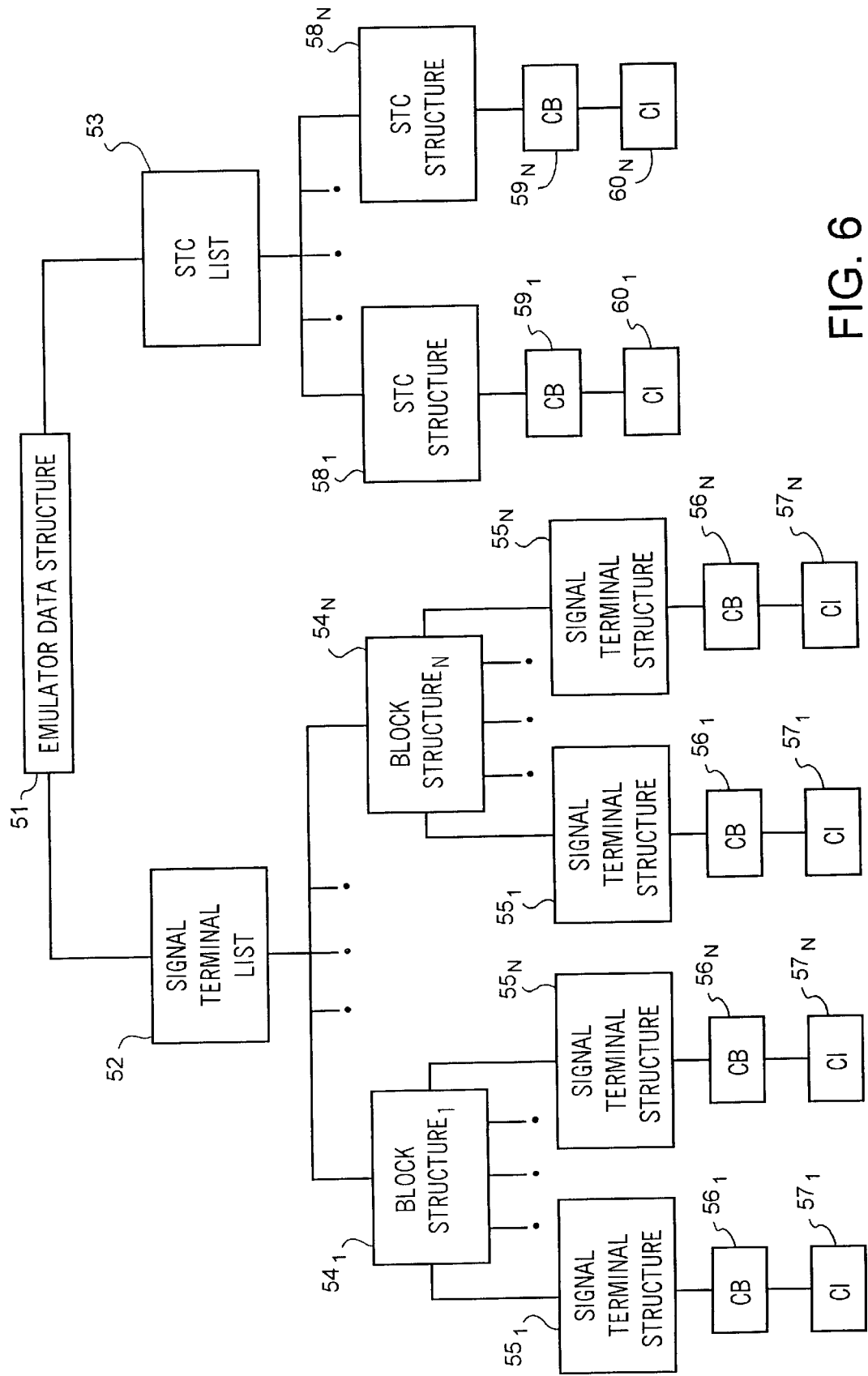
FIG. 6 is an illustrative drawing of a telecommunication system emulator data structure and its relationship to associated CBs and CIs according to the teachings of the present invention.

FIG. 6 is an illustrative drawing of a telecommunication system emulator data structure 51 and its relationship to associated CBs and CIs according to the teachings of the present invention. The emulator data structure 51 exists for each emulator connected to the network manager. There is no practical limit to the number of emulator data structures 51 which may be implemented in the network manager configuration, although constraints may be imposed by the workstation operating system limits.

The emulator data structure 51 includes a Signal Terminal List (SigTermList) structure 52 and a Signaling Terminal Central List (STCList) structure 53. Signaling Terminals are endpoints in a target telecommunication node or emulated node that uniquely identify a SS7 signaling point in the node. The SigTermList structure 52 contains information relating to the defined Signal Terminals in the emulator. Each Signal Terminal is uniquely identified by a "block owner" and a Signal Terminal Number (ST#). Each block owner is represented by a Block Structure $54_1$ through $54_N$. Each block owner may have from zero to 65,535 associated Signal Terminals, therefore each Block Structure 54 may have from zero to 65,535 associated Signal Terminal (SigTerm) Structures $55_1$ through $55_N$. Each defined SigTerm Structure 55 has an associated Connection Block (CB) $56_1$ through $56_N$. Each Connection Block 56, in turn, has an associated Connection Information (CI) $57_1$ through $57^N$.

When a message is received in the network manager 10 from a Signal Terminal of a connected emulator, the message is first decoded to determine the Signal Terminal from SigTermList 52 and the Block Structure 54 originating the message. This information is then utilized by the network manager 10 in an attempt to find a represented SigTerm Structure 55. Data messages may be received from emulator Signal Terminals that are not defined in the network manager. In such a case, no SigTerm Structure 55 is found, and the data is discarded (dropped). If a SigTerm Structure is found, then the associated CB 56 is fetched. After the signal information is decoded into internal network manager representation, the network manager 10 utilizes the CB 56 to determine the destination side of the connection. The network manager then formats and routes the data accordingly.

When a message is being transmitted to a Signal Terminal of a connected emulator, the network manager 10 formats the message into emulator CPU instructions and transmits them to the appropriate block owner (from the block structure) and Signal Terminal.

The STCList structure contains information relating to the defined Signaling Terminal Centrals (STCs) in the emulator. Each STC is uniquely identified by a STC number (STC#). There may be from zero to 65,535 STCs associated with an emulator. Each STC has an associated CB.

When a message is received from a STC of a connected emulator, the message is first decoded to determine the STC originating the message. This information is then utilized by the network manager to search the STCList 53 in an attempt to find a represented STC Structure $58_1$ through $58_N$. Data messages may be received from emulator STCs that are not defined in the network manager. In such a case, no STC Structure 58 is found, and the message is dropped. If a STC Structure is found, then an associated CB $59_1$ through $59_N$ and CI $60_1$ through $60_N$ are fetched. After the signal information is decoded into the internal network manager representation, the network manager 10 utilizes the CB 59 to determine the destination side of the connection. The network manager then formats and routes the data accordingly.

When a message is being transmitted to a STC of a connected emulator, the network manager 10 formats the message into emulator CPU instructions and transmits them to the emulator.

Figure 7:
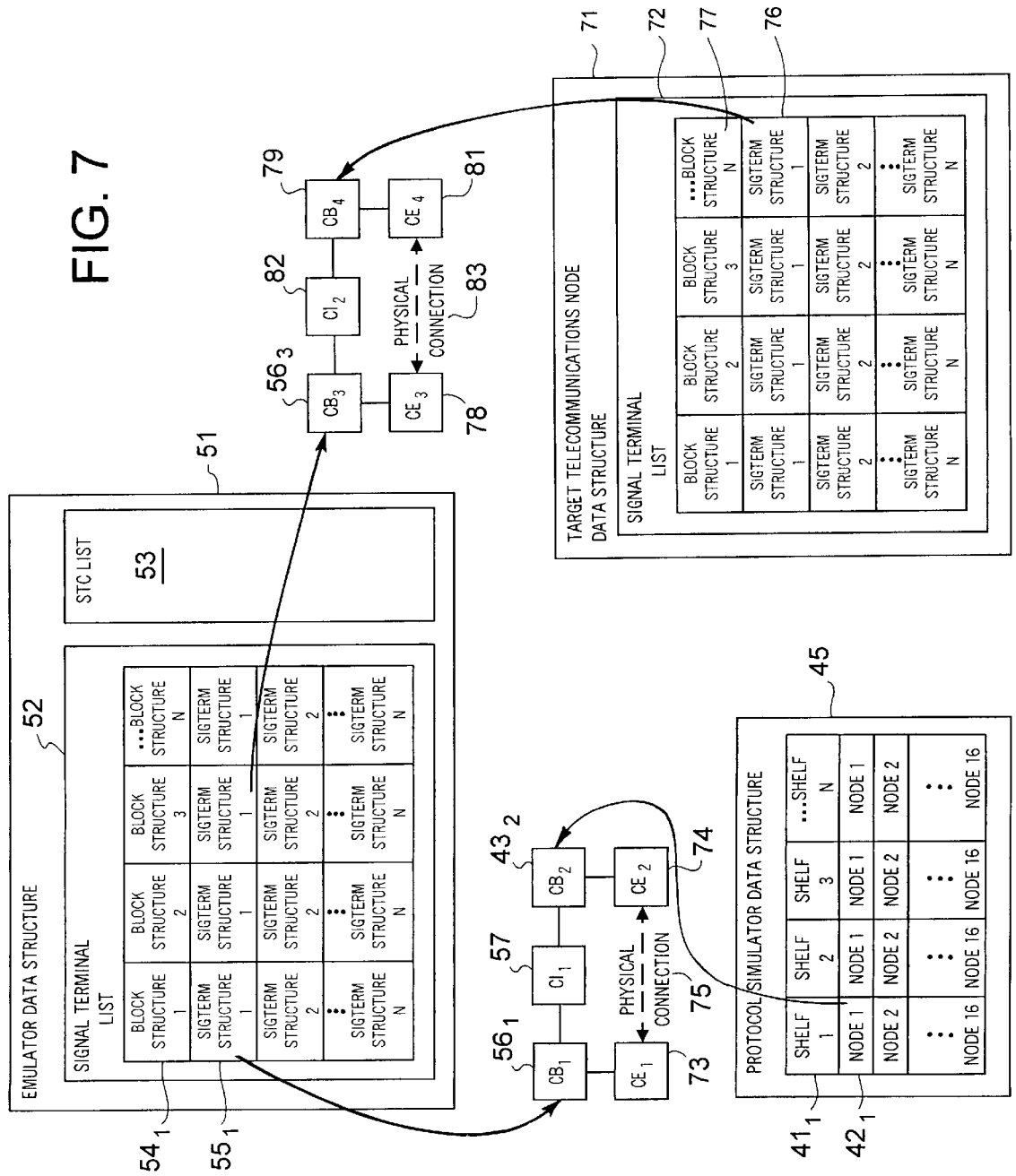
FIG. 7 is a simplified block diagram of the data structures, CBs, and CIs involved in connecting an emulator, a protocol simulator, and a target telecommunication node through the network manager of the present invention.

FIG. 7 is a simplified block diagram of the structures, Connection Blocks (CBs) and Connection Informations (CIs) involved in connecting an emulator, a protocol simulator, and a target telecommunication node through the network manager of the present invention. A plurality of CIs are utilized as shown in FIG. 4 to connect CBs and connection endpoints. The Emulator data structure 51 (see FIG. 6) is shown to include the Signal Terminal (SigTerm) List 52 and the STC List 53 (the details of which are not shown in FIG. 7). The SigTermn List 52 comprises a plurality of Block Structures and a plurality of SigTerm Structures for each Block Structure as shown in FIG. 6. The Protocol Simulator data structure 45 comprises a plurality of shelves and a plurality of nodes for each shelf, as shown in FIG. 5. A Target Telecommunications Node data structure 71 is shown to include a Signal Terminal (SigTerm) List 72. The SigTerm List 72 is identical to the SigTerm List 52 in the Emulator 51, which emulates the same target telecommunications node, and comprises a plurality of Block Structures and a plurality of SigTerm Structures for each Block Structure.

In the illustration shown in FIG. 7, a first connection is made between SigTerm Structure$_1$ 55$_1$ (associated with Block Structure$_1$ 54$_1$ in the Emulator data structure 51), and Node$_1$ 42$_1$ (associated with Shelf$_1$ 41$_1$ in the Protocol Simulator data structure 45). The CB$_1$ 56$_1$ is associated with the SigTerm Structure$_1$ 55$_1$ which is represented physically as Connection Endpoint (CE$_1$) 73. The CB$_2$ 43$_2$ is associated with the Node$_1$ 42$_1$ which is represented physically as CE$_2$ 74. The CI 57 connects CB$_1$ 56$_1$ and CB$_2$ 43$_2$. A physical connection 75 is then made between the two physical CE's 73 and 74. This process is described in more detail in FIGS. 8A–8E below.

A second connection is made between SigTerm Structure$_1$ 55$_1$ (associated with Block Structure$_3$ 54$_3$ in the Emulator data structure 51), and SigTerm Structure$_1$ 76 (associated with Block Structure$_N$ 77 in the Target Telecommunications Node data structure 71). The CB$_3$ 56$_3$ is associated with the SigTenn Structure$_1$ 55$_1$ of Block Structure$_3$ which is represented physically as CE$_3$ 78. The CB$_4$ 79 is associated with the SigTerm Structure$_1$ 76 which is represented physically as CE$_4$ 81. The CI 82 connects CB$_3$ 56$_3$ and CB$_4$ 79. A physical connection 83 is then made between the two physical CE's 78 and 81.

FIGS. 8A–8E are a flow chart illustrating the steps involved in defining an emulator, defining a protocol simulator, and processing SS7 messages between the emulator and the protocol simulator through the network manager of the present invention. In steps 91 through 96, emulator data is define in the network manager 10. Referring to FIGS. 1, 6, and 8, at step 91, a system operator defines the telecommunication emulator in the Network Designer function 25 (FIG. 1) of the network manager. At step 92, the system operator defines the signaling terminals (STs) connected to the emulator. This is followed at 93 by the creation of the signal terminal list 52 (FIG. 6). At 94, the system operator assigns a CPU instruction block for each ST, thereby creating the block structure 54. At 95, the system operator defines the signaling type for each ST, thereby creating the signal terminal structure 55. At 96, the definition of the emulator data is completed by creating a Connection Block 56 corresponding to the signal terminal structure 55. The process then moves to FIG. 8B.

Figure 8A:
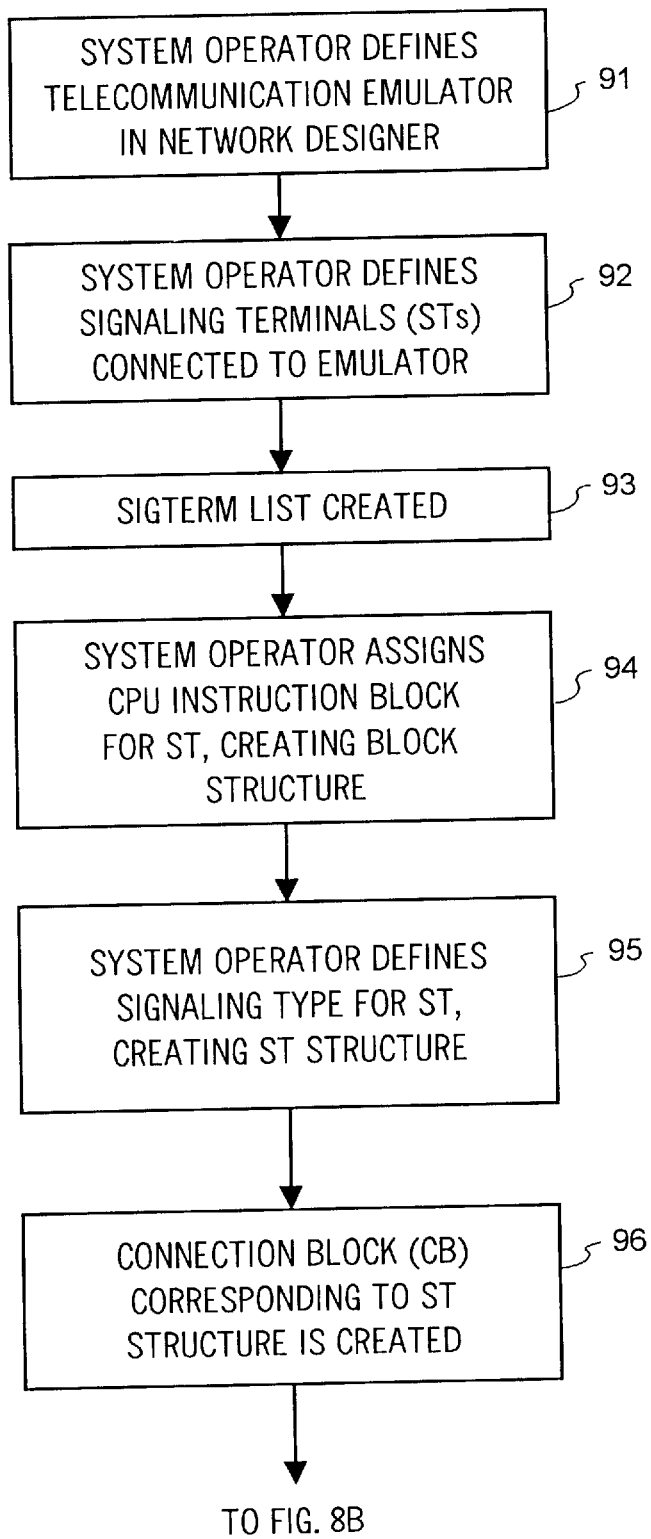
FIGS. 8A–8E are a flow chart illustrating the steps involved in defining an emulator, defining a protocol simulator, and processing SS7 messages between the emulator and the protocol simulator through the network manager of the present invention.
Figure 8B:
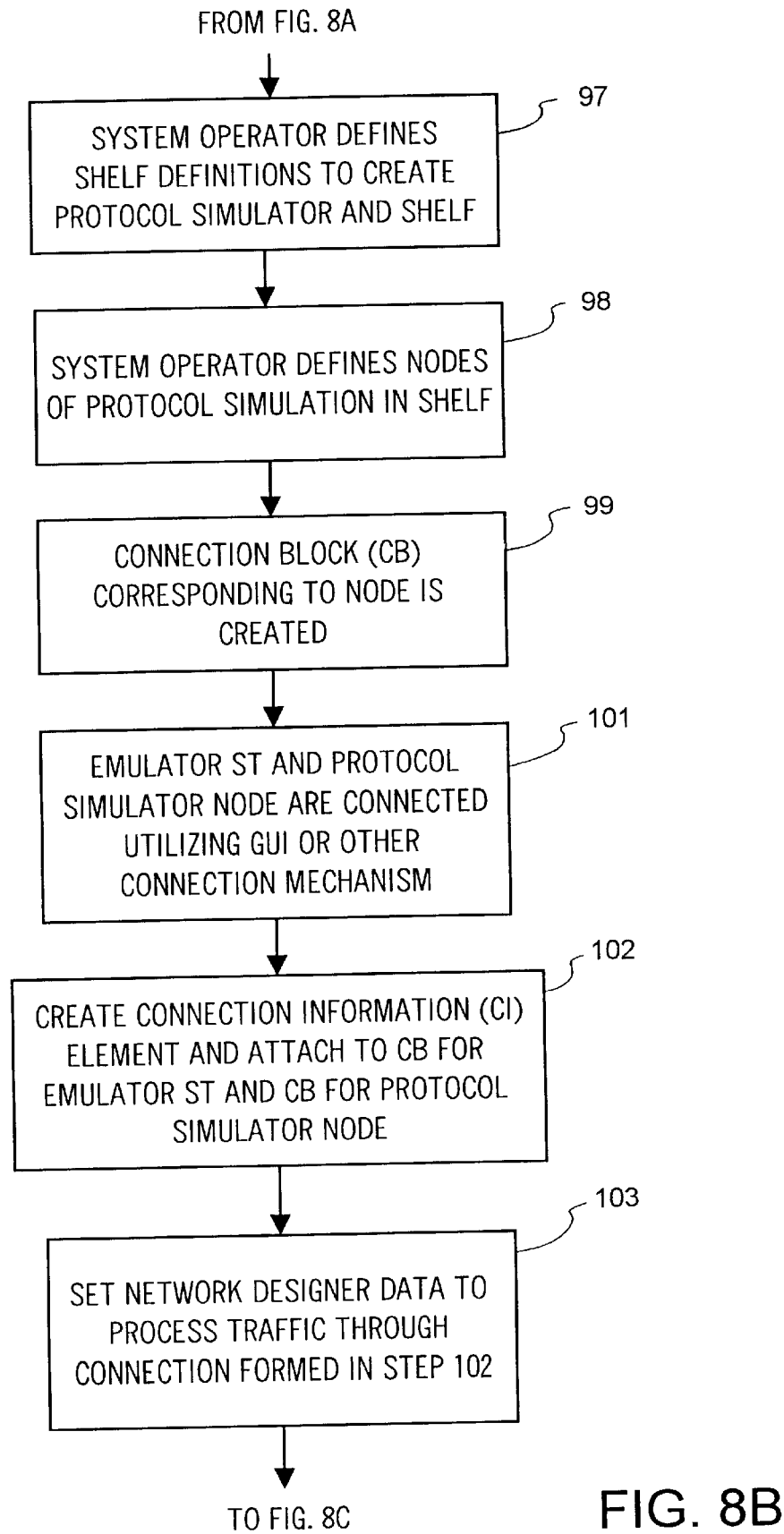

In steps 97–99 of FIG. 8B, protocol data is defined in the network manager 10. Referring to FIGS. 1, 5, and 8, at step 97, the system operator defines, in the protocol simulator 17, the definition of the shelves 41, thereby creating the protocol simulator data structure 45 and the shelf 41. At 98, the system operator defines the nodes 42 of the protocol simulation in the shelf 41, thereby creating the nodes 42. At 99, the definition of the protocol data is completed by creating a Connection Block 43 corresponding to the node 42.

Steps 101–103 make the connection of data elements in the emulator and the protocol simulator. The process moves to step 101 where, utilizing the GUI or other connection mechanism, the system operator connects the emulator signal terminal and the protocol simulator node. At 102, a CI 31 (FIG. 4) is created, attaching to the CB 56 for the emulator ST and to the CB 43 for the protocol simulator node 42. The connection is completed in step 103 where data in the Network Designer 25 is set to process traffic through the connection formed in step 102.

Figure 9:
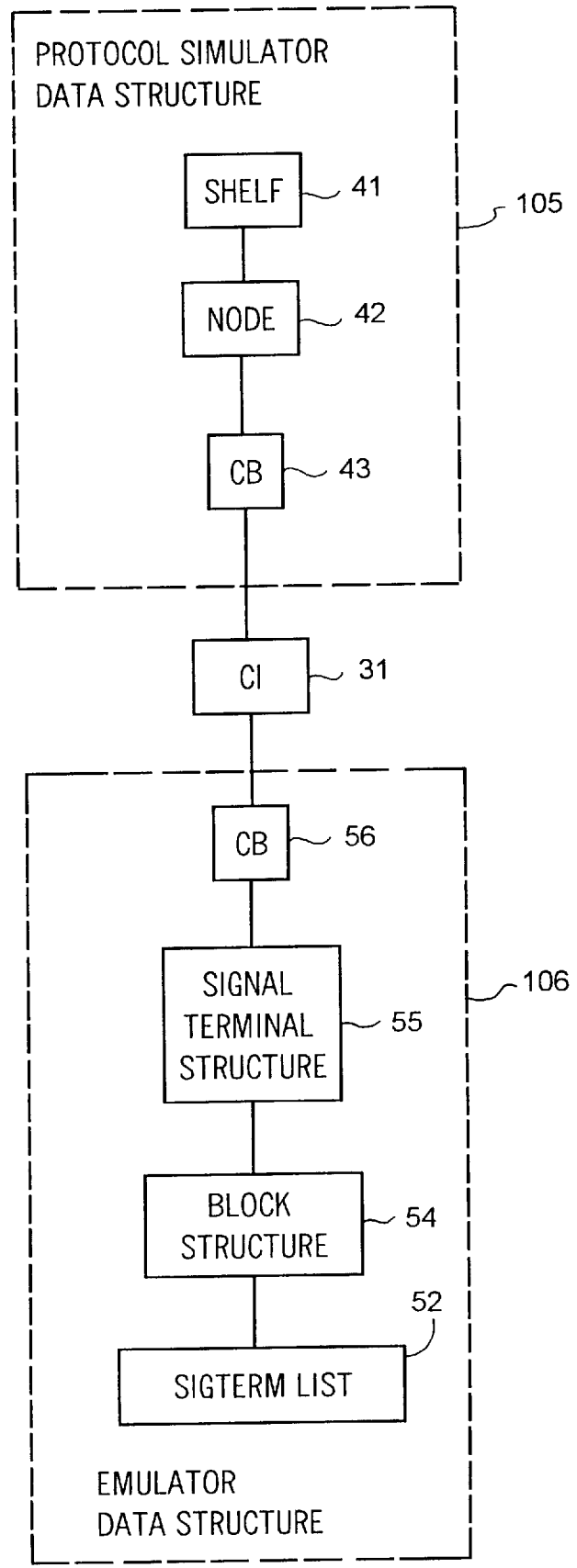
FIG. 9 is a simplified functional block diagram of a connection between an emulator and a protocol simulator in the network manager of the present invention.

Referring briefly to FIG. 9, there is shown a simplified functional block diagram of a connection between a protocol simulator data structure 105 and an emulator data structure 106 in the network manager of the present invention. The data elements for the protocol simulator include the the shelf 41, the node 42 and the CB 43 (see FIG. 5). These data elements are defined as shown above in steps 97–99. The data elements for the emulator include the signal terminal list 52, the block structure 54, the signal terminal structure 55, and the CB 56 (see FIG. 6). These data elements are defined as shown above in steps 91–96. The CI 31 connects the protocol simulator data elements 105 and the emulator data elements 106. The CI 31 is created as shown above is steps 101–103.

Figure 8C:
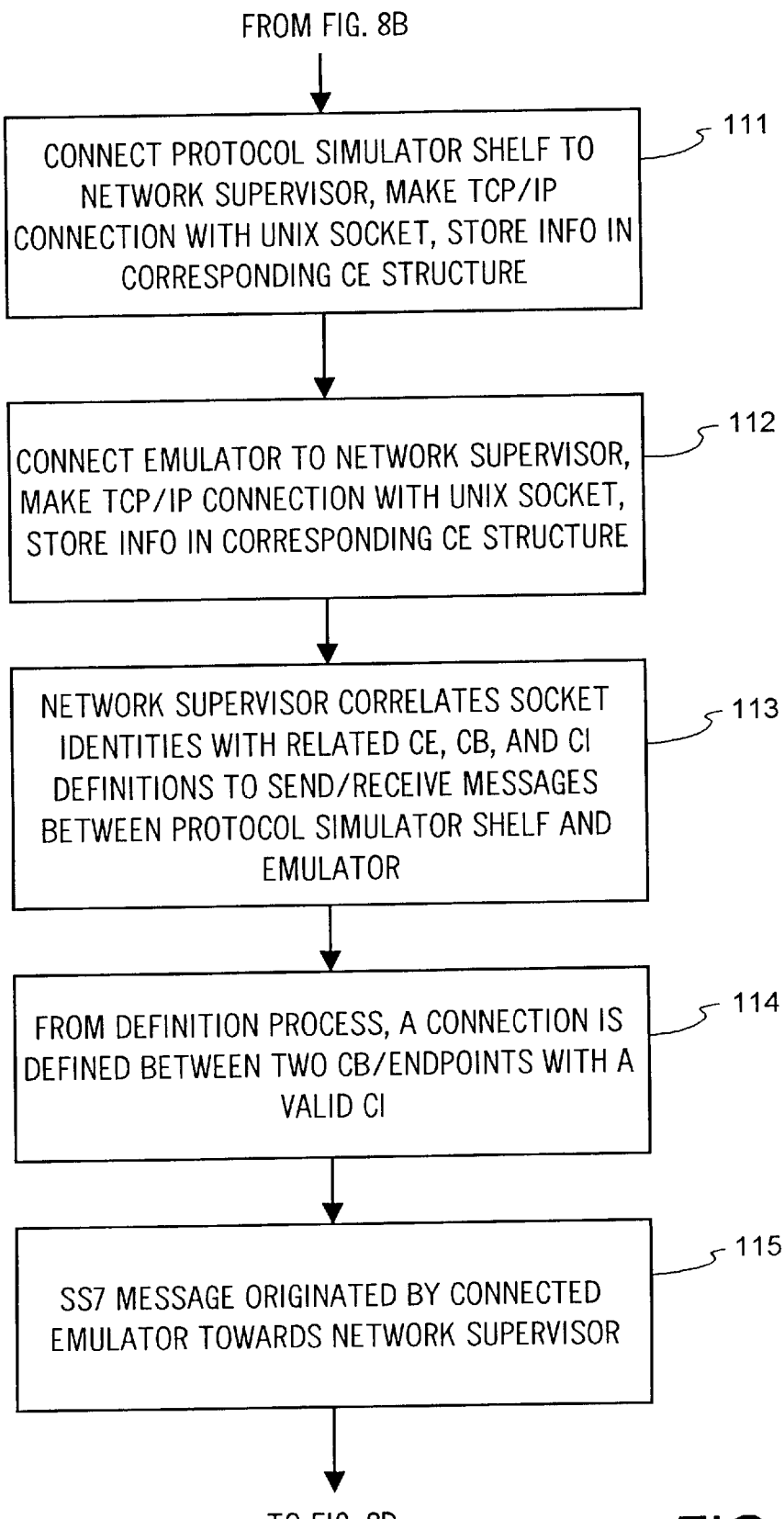

Referring again to FIG. 8, the process moves from FIG. 8B to FIG. 8C. Steps 111 through 113 illustrate the steps involved in making an actual UNIX connection between two endpoints such as the protocol simulator and the emulator. In step 111, the protocol simulator shelf 41 is connected to the Network Supervisor 26 (FIG. 1), a TCP/IP connection with a UNIX socket is made, and associated information is stored in a corresponding Connection Endpoint (CE) data structure. At 112, an emulator is connected to the Network Supervisor, a TCP/IP connection with a UNIX socket is made, and associated information is stored in a corresponding Connection Endpoint (CE) data structure. At 113, the connection is completed as the Network Supervisor 26 correlates socket identities with related CE, CB, and CI definitions in order to send and receive messages between the protocol simulator shelf and the emulator, as was illustrated by the physical connection 75 in FIG. 7.

Figure 8D:
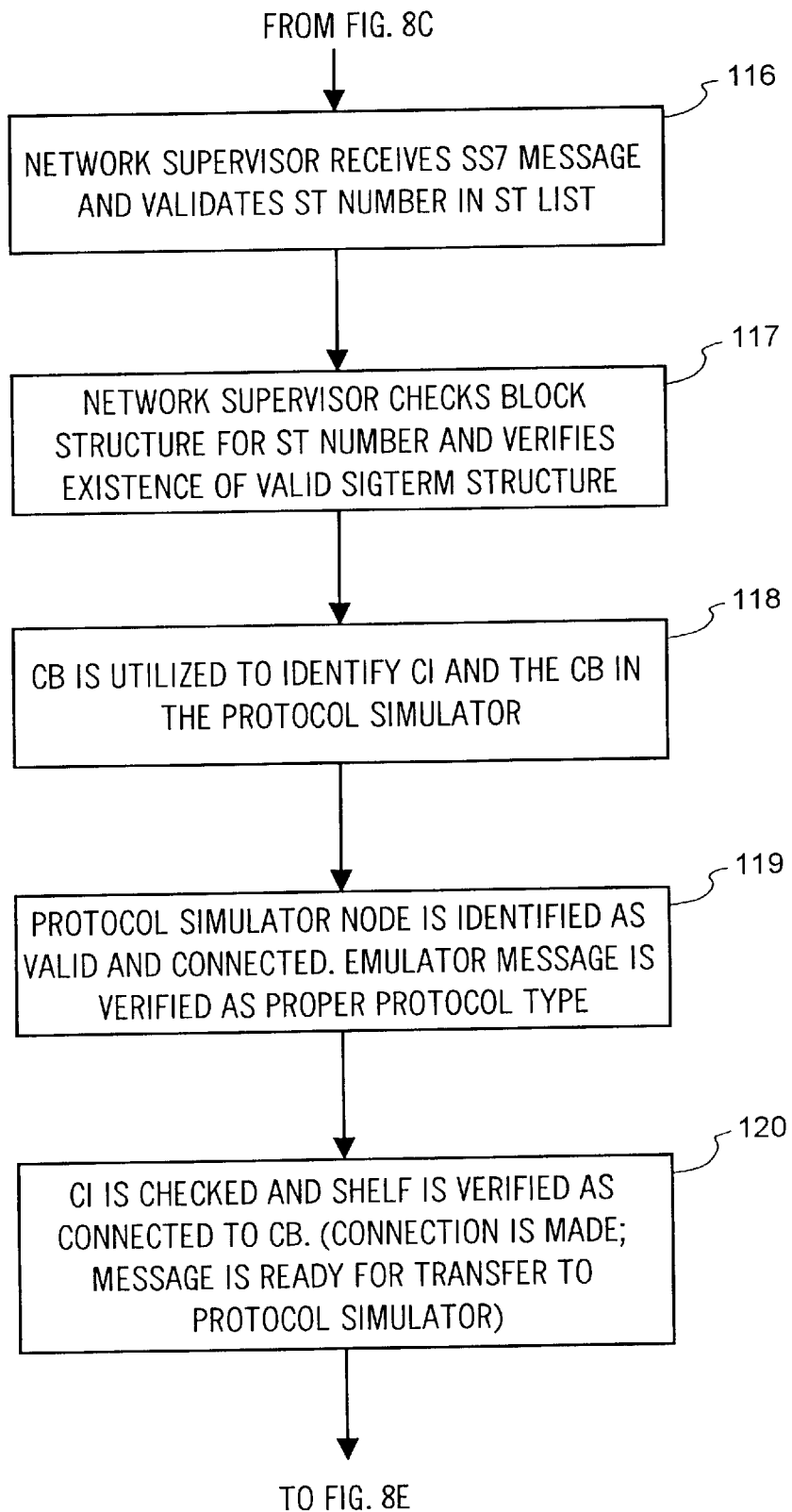
Figure 8E:
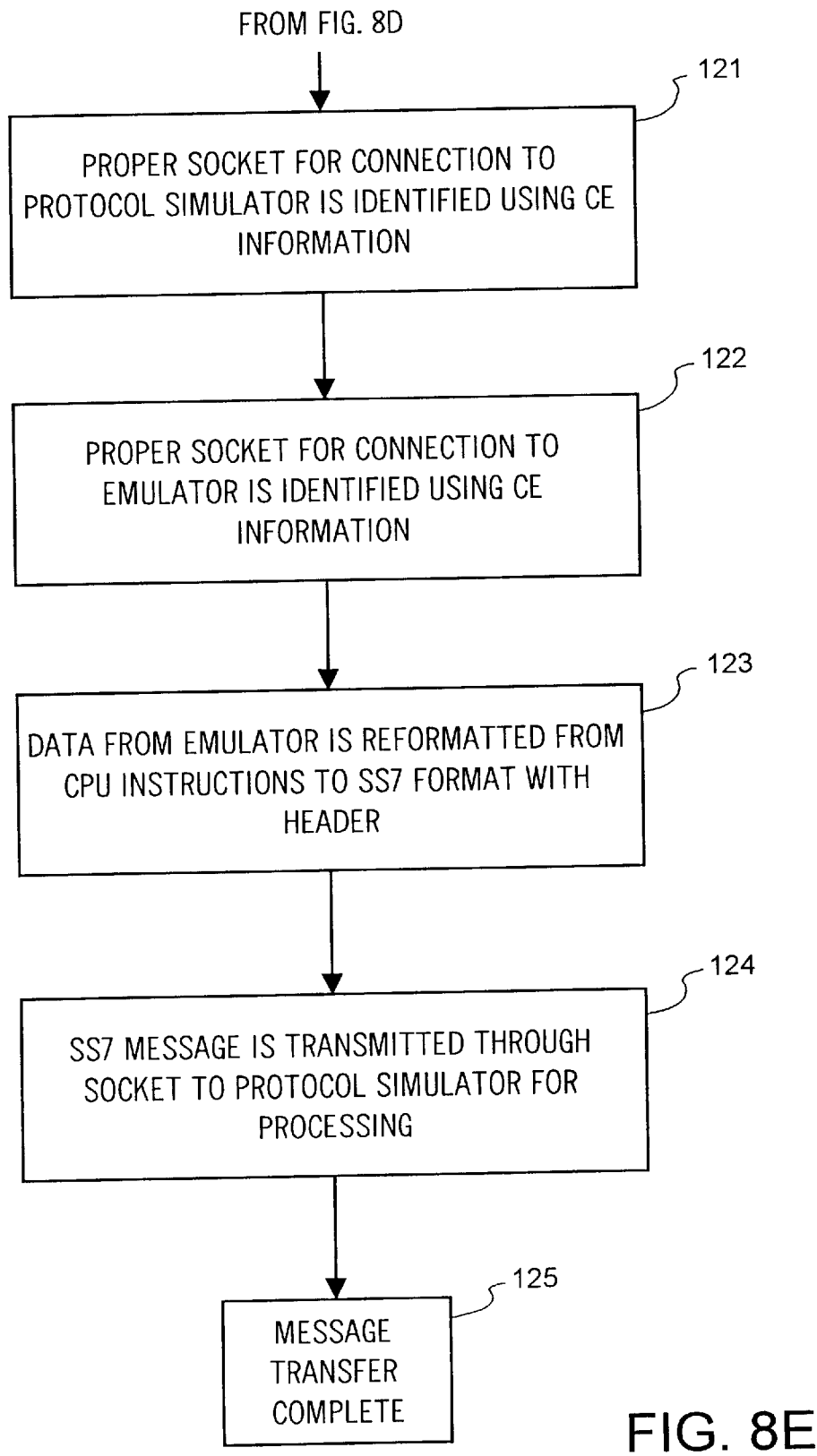

Steps 114 of FIG. 8C through step 125 of FIG. 8E illustrate the steps involved in processing a SS7 message through the network manager 10 from an emulator to the protocol simulator. Following the definition process above, in which emulator data and protocol simulator data are defined, a connection is defined. As shown in step 114, the connection is defined between two connection endpoints and their associated CBs through a valid CI 31 (FIG. 3). At 115, the SS7 message is originated by the connected emulator towards the Network Supervisor 26 by an internal emulator stimulus.

The process then moves to FIG. 8D, step 116 where the Network Supervisor 26 receives the SS7 message and validates the Signaling Terminal number (ST#) in the ST list 53. At step 117, the Network Supervisor checks the Block Structure 54 for the ST# and verifies the existence of a valid SigTerm Structure 55. At step 118, the emulator CB 56 is utilized to identify the Cl 31 and the protocol simulator CB 43. At step 119, the protocol simulator node 42 is identified as valid and connected. The emulator message is verified as the proper protocol type. At step 120, the CI 31 is checked, and the protocol simulator shelf 41 is verified as connected through the CB 43. The connection is thus made, and the message is ready for transfer from the emulator to the protocol simulator.

The process then moves to FIG. 8E, step 121 where the proper UNIX socket for connection to the protocol simulator is identified using the CE information stored in step 111. The process then moves to step 122 where the proper UNIX socket for connection to the emulator is identified using the CE information stored in step 112. In step 123, data from the emulator is reformatted from CPU instructions to SS7 data with header. At 124, the SS7 message is transmitted over the network (for example, a LAN) through the UNIX socket connections to the protocol simulator for processing. The message transfer is complete at step 125.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A network manager for automatically configuring and controlling in real time a simulated telecommunications network having a plurality of nodes which communicate in a plurality of communications protocols, said network manager comprising:

means for connecting each of said plurality of nodes to said network manager;

means for disconnecting each of said plurality of nodes from said network manager;

means for determining which of said plurality of communications protocols is utilized by each of said plurality of nodes;

means for establishing connections between nodes which communicate in compatible communications protocols; and means for denying connections requested between nodes which communicate in incompatible communications protocols.

2. The network manager for configuring and controlling a simulated telecommunications network of claim 1 further comprising means for dynamically reconfiguring said network in real time upon connecting one of said plurality of nodes to said network and upon disconnecting one of said plurality of nodes to said network.

3. The network manager for configuring and controlling a simulated telecommunications network of claim 2 wherein said means for connecting each of said plurality of nodes to said network manager includes means for connecting at least one telecommunication system emulator.

4. The network manager for configuring and controlling a simulated telecommunications network of claim 2 wherein said means for connecting each of said plurality of nodes to said network manager includes means for connecting at least one communications protocol simulator.

5. The network manager for configuring and controlling a simulated telecommunications network of claim 2 wherein said means for connecting each of said plurality of nodes to said network manager includes means for connecting at least one target telecommunications hardware node.

6. The network manager for configuring and controlling a simulated telecommunications network of claim 1 further comprising means for allocating said plurality of nodes to a plurality of workstations.

7. The network manager for configuring and controlling a simulated telecommunications network of claim 6 further comprising:

means for initializing each of said plurality of workstations; and means for designating each of said plurality to workstations to execute specified emulation software programs.

8. The network manager for configuring and controlling a simulated telecommunications network of claim 7 wherein said means for designating each of said plurality to workstations to execute specified emulation software programs includes means for designating one of said plurality of workstations to execute more than one specified emulation software program.

9. The network manager for configuring and controlling a simulated telecommunications network of claim 1 wherein said means for establishing connections between nodes which communicate in compatible communications protocols includes means for interconnecting nodes by remote shell to a specified workstation.

10. The network manager for configuring and controlling a simulated telecommunications network of claim 1 wherein said connections between nodes which communicate in compatible communications protocols are UNIX sockets.

11. The network manager for configuring and controlling a simulated telecommunications network of claim 1 wherein said connections between nodes which communicate in compatible communications protocols include:

means for encapsulating messages in a telecommunications protocol in the Transmission Control Protocol/Internet Protocol (TCP/IP) protocol;

means for connecting a first node to a network utilizing a first Internet socket connection;

means for connecting a second node to the network utilizing a second Internet socket connection; and means for transmitting encapsulated telecommunications protocol messages via said network from said first node to said second node.

12. The network manager for configuring and controlling a simulated telecommunications network of claim 11 wherein said network is the Internet.

13. The network manager for configuring and controlling a simulated telecommunications network of claim 1 further comprising means for monitoring data as said data passes between said nodes.

14. The network manager for configuring and controlling a simulated telecommunications network of claim 1 further comprising a Graphical User Interface (GUI) which enables an operator to configure and control said network by dragging and dropping icons and lines on a display screen.

15. The network manager for configuring and controlling a simulated telecommunications network of claim 1 wherein said means for establishing connections between nodes which communicate in compatible communications protocols includes:

a plurality of Connection Information (CI) blocks, each of which includes information necessary to complete a connection to a particular one of said plurality of nodes in said network;

a plurality of Connection Blocks (CBs), each of which is an abstraction of a particular connection endpoint;

a pointer within each originating CB to an associated CI block; and a pointer within each CI block to a terminating CB.

16. The network manager for configuring and controlling a simulated telecommunications network of claim 1 further comprising means for interfacing said network manager with at least one other network manager.

17. A network manager for configuring and controlling a simulated telecommunications network having a plurality of nodes which communicate in a plurality of communications protocols, said network manager comprising:

a Designer function that sets up the network; and a Supervisory function that dynamically controls the network.

18. The network manager for configuring and controlling a simulated telecommunications network of claim 17 wherein said Designer function includes:

means for defining said plurality of nodes; and means for establishing an initial network configuration by allocating each of said plurality of nodes to a workstation.

19. The network manager for configuring and controlling a simulated telecommunications network of claim 17 wherein said Supervisory function includes:
   means for monitoring the status of each of said plurality of nodes;
   means for monitoring the status of links between said nodes; and
   means for dynamically reconfiguring said network.

20. The network manager for configuring and controlling a simulated telecommunications network of claim 19 wherein said means for dynamically reconfiguring said network includes a Graphical User Interface (GUI) which enables an operator to reconfigure said network by dragging and dropping icons and lines on a display screen while said network continues to operate.

21. The network manager for configuring and controlling a simulated telecommunications network of claim 17 further comprising a Monitor function which displays to an operator, message data being transmitted between any two of said plurality of nodes in said network.

22. The network manager for configuring and controlling a simulated telecommunications network of claim 21 wherein said Monitor function utilizes a Graphical User Interface (GUI) through which an operator may view on a display screen, message data being transmitted between any two of said plurality of nodes by placing a monitor icon over a graphical representation of a link between said two nodes.

23. The network manager for configuring and controlling a simulated telecommunications network of claim 17 further comprising a Protocol Simulator Based Monitor (PSBM) function which decodes message data being transmitted between any two of said plurality of nodes in said network and displays said decoded message data to an operator in a user-friendly format.

24. The network manager for configuring and controlling a simulated telecommunications network of claim 17 further comprising means for broadcasting a socket-based SS7 message from an originating node in the network to a plurality of receiving nodes in the network.

25. The network manager for configuring and controlling a simulated telecommunications network of claim 24 wherein said means for broadcasting a socket-based SS7 message from an originating node in the network to a plurality of receiving nodes in the network includes a broadcast function which connects the originating node to the plurality of receiving nodes and enables identical messages to be sent from the originating node to each of the receiving nodes.

26. The network manager for configuring and controlling a simulated telecommunications network of claim 25 wherein said broadcast function includes means for enabling a plurality of originating nodes to broadcast messages to a single receiving node.

27. A method of automatically configuring and controlling in real time a simulated telecommunications network having a plurality of nodes which communicate in a plurality of communications protocols, said method comprising the steps of:
   connecting each of said plurality of nodes to said network manager;
   determining which of said plurality of communications protocols is utilized by each of said plurality of nodes;
   establishing connections between nodes which communicate in compatible communications protocols; and
   denying connections requested between nodes which communicate in incompatible communications protocols.

28. The method of configuring and controlling a simulated telecommunications network of claim 27 further comprising the step of dynamically reconfiguring said network in real time upon connecting one of said plurality of nodes to said network and upon disconnecting one of said plurality of nodes to said network.

29. The method of configuring and controlling a simulated telecommunications network of claim 28 wherein said step of connecting each of said plurality of nodes to said network manager includes connecting at least one telecommunication system emulator.

30. The method of configuring and controlling a simulated telecommunications network of claim 28 wherein said step of connecting each of said plurality of nodes to said network manager includes connecting at least one communications protocol simulator.

31. The method of configuring and controlling a simulated telecommunications network of claim 28 wherein said step of connecting each of said plurality of nodes to said network manager includes connecting at least one target telecommunications hardware node.

32. The method of configuring and controlling a simulated telecommunications network of claim 27 further comprising the step of allocating said plurality of nodes to a plurality of workstations.

33. The method of configuring and controlling a simulated telecommunications network of claim 32 further comprising the steps of:
   initializing each of said plurality of workstations; and
   designating each of said plurality to workstations to execute specified emulation software programs.

34. The method of configuring and controlling a simulated telecommunications network of claim 33 wherein said step of designating each of said plurality to workstations to execute specified emulation software programs includes designating one of said plurality of workstations to execute more than one specified emulation software program.

35. The method of configuring and controlling a simulated telecommunications network of claim 27 wherein said step of establishing connections between nodes which communicate in compatible communications protocols includes interconnecting nodes by remote shell to a specified workstation.

36. The method of configuring and controlling a simulated telecommunications network of claim 27 wherein said step of establishing connections between nodes which communicate in compatible communications protocols includes establishing said connections with UNIX sockets.

37. The method of configuring and controlling a simulated telecommunications network of claim 27 further comprising the step of monitoring data as said data passes between said nodes.

38. The method of configuring and controlling a simulated telecommunications network of claim 27 further comprising the step of enabling an operator to dynamically control said network by dragging and dropping icons and lines on a display screen utilizing a Graphical User Interface (GUI).

* * * * *